United States Patent [19]
Lupke

[11] Patent Number: 5,456,589
[45] Date of Patent: Oct. 10, 1995

[54] MULTICAVITY MOLD BLOCKS

[76] Inventor: Manfred A. A. Lupke, 10 McLeary Court, Concord, Ontario, L4K 2Z3, Canada

[21] Appl. No.: 76,781

[22] Filed: Jun. 15, 1993

[30] Foreign Application Priority Data

Jun. 15, 1992 [GB] United Kingdom .................. 9212684

[51] Int. Cl.$^6$ .......................... B29C 49/38; B29C 51/36
[52] U.S. Cl. ..................... 425/233; 264/209.4; 264/508; 264/568; 425/326.1; 425/336; 425/388; 425/396
[58] Field of Search ............................. 425/133.1, 387.1, 425/388, 393, 396, 326.1, 395, 325, 233, 336; 264/209.4, 508, 566, 568

[56] References Cited

U.S. PATENT DOCUMENTS

| | | | |
|---|---|---|---|
| 3,976,414 | 8/1976 | Hegler et al. ............................ | 425/395 |
| 4,087,224 | 5/1978 | Moser ..................................... | 425/388 |
| 4,325,685 | 4/1982 | Lupke et al. ........................... | 425/183 |
| 4,381,276 | 4/1983 | Hegler et al. .......................... | 425/388 |
| 4,668,175 | 5/1987 | Martin .................................... | 425/388 |
| 4,674,969 | 6/1987 | Korn ....................................... | 425/325 |
| 4,900,503 | 2/1990 | Hegler et al. .......................... | 425/396 |
| 4,983,347 | 1/1991 | Rahn ...................................... | 425/396 |
| 5,141,427 | 8/1992 | Hegler et al. .......................... | 425/396 |

*Primary Examiner*—Jay H. Woo
*Assistant Examiner*—Joseph Leyson

[57] ABSTRACT

A travelling mold tunnel for the vacuum forming of profiled tube from extruded parison of molten thermoplastic material includes a plurality of parallel mold cavities with a vacuum applied to each of the mold cavities.

5 Claims, 4 Drawing Sheets

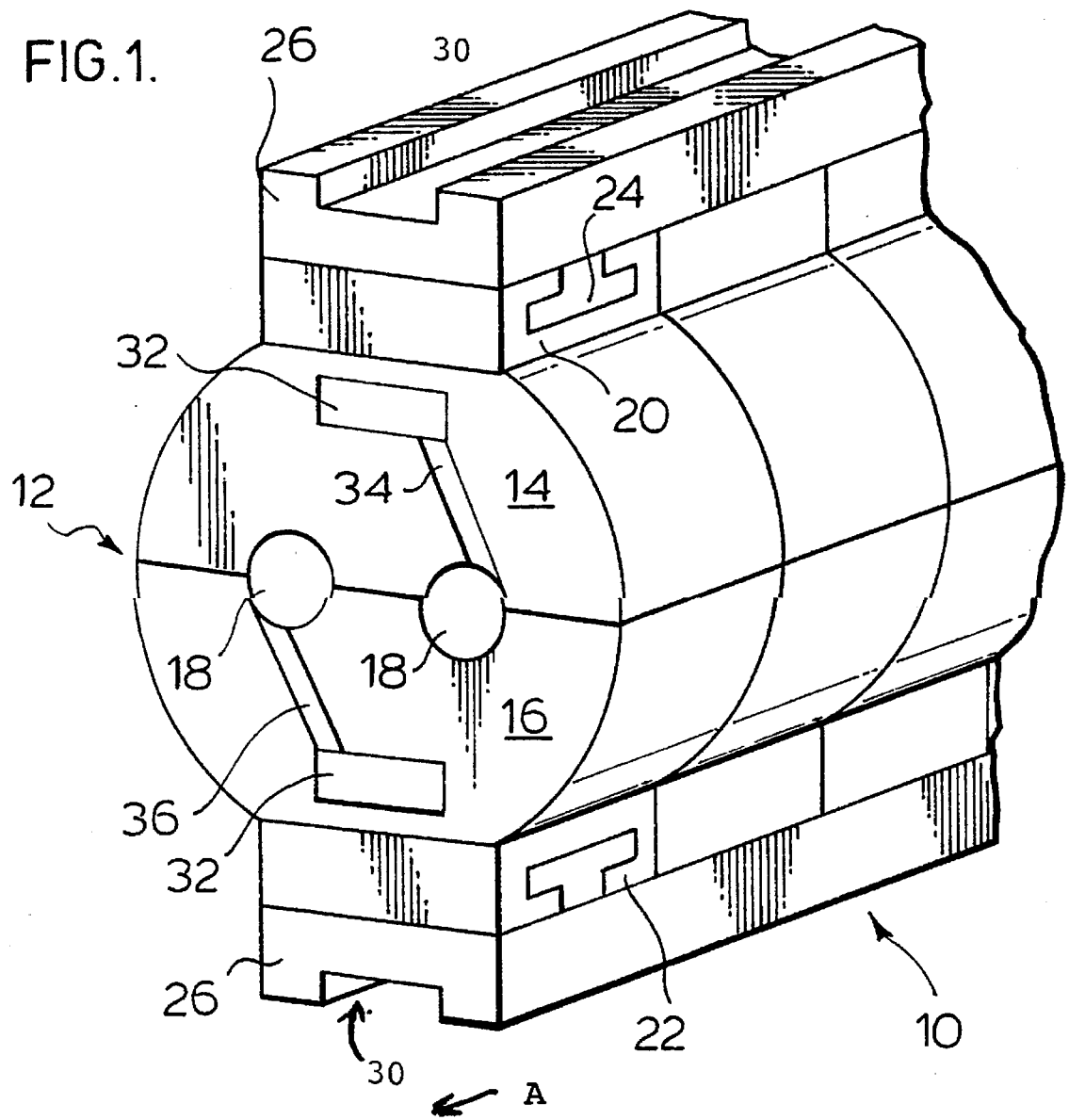

MULTICAVITY MOLD BLOCKS

FIELD OF THE INVENTION

This invention relates to an apparatus for simultaneously forming a plurality of profiled tubes in a single travelling mold tunnel. The profiled tube may be, for example, ribbed tube or corrugated tube such as single walled corrugated tube or double walled corrugated tube having a corrugated outer wall and a smooth inner wall.

BACKGROUND OF THE INVENTION

Corrugated thermoplastic tube may be made an apparatus of the travelling mold tunnel type with vacuum forming is disclosed, for example, in U.S. Pat. No. 4,226,580 issued Oct. 7th, 1980 to Gerd P. H. Lupke and Manfred A. A. Lupke, U.S. Pat. No. 4,319,872 issued Mar. 16, 1982 to Manfred A. A. Lupke, U.S. Pat. No. 3,538,209 issued Nov. 3, 1970 to W. Hegler, and U.S. Pat. No. 5,002,478 to Manfred A. A. Lupke on Mar. 26, 1991. Numerous other patents generally concern travelling mold type apparatus for forming profiled tube. The patents referred to are intended to be merely exemplary of the large number in the field.

A travelling mold tunnel may often be utilized for molding tube of different diameters by substitution of the mold blocks or by the use of interchangeable mold blocks as disclosed in U.S. Pat. No. 4,325,685 issued on Apr. 20, 1982 to Manfred A. A. Lupke. However, a necessary criterion for such tunnels is that they be of sufficient size and power to accommodate the largest mold blocks which it is expected to use. Such mold tunnels are large and may be uneconomic in use for molding tube of very small diameter using small mold blocks.

One reason for the reduced efficiency in the molding of small diameter tube is due to the utilisation of the cooling capacity of the machine. This is measured in terms of the weight of tube which can be produced on the machine during a given period. If large mold blocks are used in a travelling mold tunnel, the tunnel will be run at a slower speed than when small mold blocks are used. Nevertheless, efficiency of the machine may be greater for the large molds since a greater weight of-material may be processed using the cooling capacity of the machine efficiently. For the greater speeds and lesser weights of material processed in small molds, problems arise in utilising the cooling capacity fully.

Further problems may arise in the provision of carrier means for the mold blocks suitable for use with very large mold blocks and for small mold blocks.

It has frequently been found desirable to utilise different travelling mold tunnels for molding large diameter tube and small diameter tube resulting, for some users in the capital expense of more than one machine.

SUMMARY OF THE PRESENT INVENTION

The problem of providing a single travelling mold tunnel suitable for molding both large and small diameter pipe has been addressed, and, according to the present invention, there is provided a travelling mold tunnel for forming profiled tube utilising vacuum forming of an extruded parison of molten thermoplastics material, in which the tunnel includes a plurality of parallel mold cavities for forming tube. The mold cavities may be of the same or different profiles and/or the same or different sizes.

In particular, a mold apparatus of the present invention has a plurality; of mold blocks which move through a mold tunnel where side by side mold blocks are .held tightly against one another in the mold tunnel. Each of the mold blocks has a plurality of separated independent parallel mold cavities extending longitudinally of the mold tunnel with the parallel mold cavities of adjacent mold blocks aligning with one another in the mold tunnel. The apparatus also includes means for applying vacuum to each of the mold cavities for the simultaneous molding of a plurality of plastic pipes in the mold apparatus.

The plurality of mold cavities may be accommodated in mold blocks of an overall size suitable for use in a large installation normally capable of molding large diameter tube. Such tube may sometimes have a diameter of as much as five feet or more.

The number of parallel mold cavities which may be provided is, of course, not only dependent on their individual diameters but also upon the overall size of the tunnel itself. It is envisaged that from two to ten cavities may conveniently be used.

The mold blocks utilised in the travelling mold tunnel may be formed in pairs of half molds carried in any convenient manner on separate conveyors as disclosed in the Lupke and Hegler patents previously referred to. Alternatively, they may be of the type disclosed in international application No. PCT/CA90/00372 filed by Manfred A. A. Lupke disclosing apparatus for making plastic tubing including hinged mold blocks. Whatever the general form of the mold blocks and the arrangements for their conveyance in the travelling mold tunnel, the invention includes mold blocks including a plurality of parallel mold cavities for the simultaneous molding of a plurality of tubes in a travelling mold tunnel including means for vacuum forming the tube in the mold blocks.

BRIEF DESCRIPTION OF THE DRAWINGS

Embodiments of the invention will now be described by way of example with reference to the drawings, in which:

FIG. 1 is a rough perspective sketch of mold blocks according to the invention assembled into a travelling mold tunnel according to the invention;

Figure 2A:
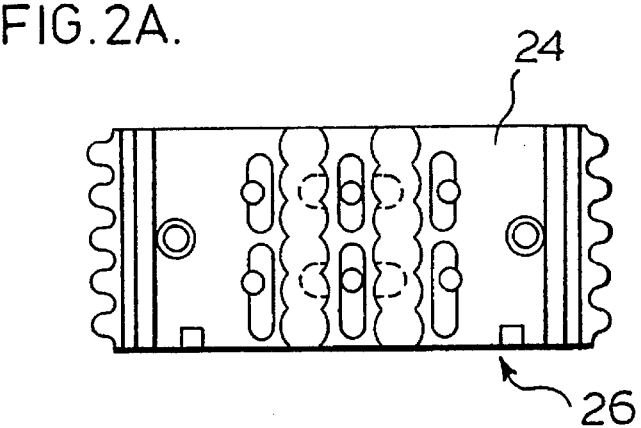
FIGS. 2A, B, C and D are views of an engineering drawing of the apparatus of FIG. 1.
Figure 2B:
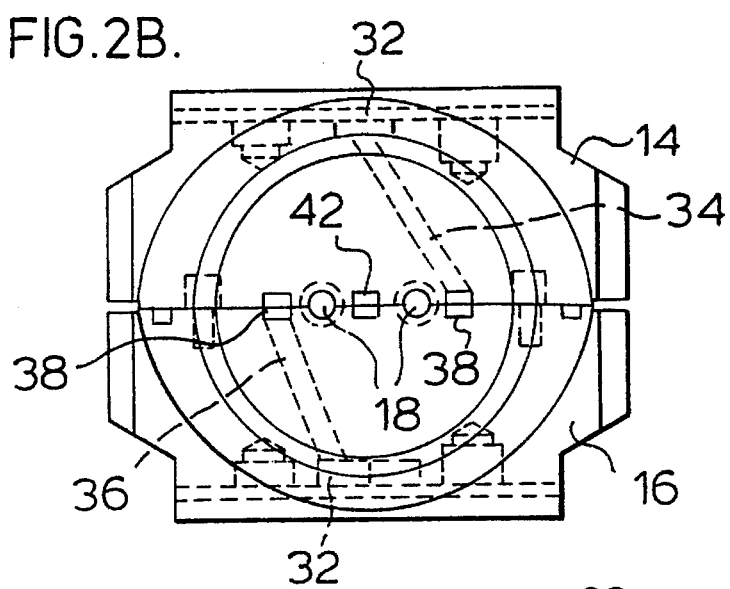
Figure 2D:
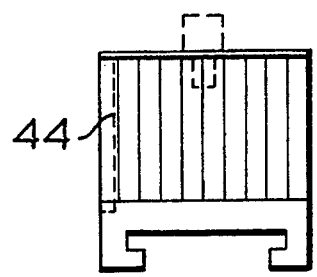
Figure 2C:
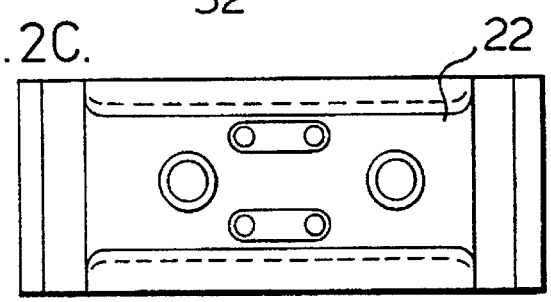

Referring to the drawings, the illustrated apparatus includes a travelling mold 10 advancing in the direction of arrow A. In this embodiment, the mold tunnel consists of two sets of mold blocks 12, each comprising a pair of cooperating mold block halves 14, 16. Each mold block 12 is illustrated in all the embodiments as comprising an upper mold block half 14 and a lower mold block half 16. It is to be understood, however that the mold block halves 14, 16 might be located side by side, might be hinged together, might not be strictly halves but rather might be unequal parts, and other configurations are also possible. The cooperating mold block halves 14, 16 of the aligned mold blocks 12 define two parallel mold tunnel cavities 18. In the embodiments illustrated the mold tunnel cavities 18 are formed by machining suitably configured half channels in the faces of the mold block halves 14, 16 which come together to form the tunnel. The configuration of the channels 18 is variable but, as may be seen from FIGS. 2A, 3A, and 4A, they may suitably be corrugated.

No means of circulating the mold block halves 14, 16 is shown but it will be appreciated that this may be by any convenient means. Moreover, FIG. 1 which is included only as a rough picture of the tunnel does not show details of the vacuum forming means applicable to the mold surface of cavities 18. Such details are illustrated in FIGS. 2, 3 and 4.

In practice, a tubular parison of thermoplastics material extrudate will be extruded into each of the mold cavities 18 to form parallel tubes simultaneously as the mold tunnel advances in the direction of arrow A.

FIG. 1 shows the mold block halves 14, 16 as having bases 20, 22 (base 20 is referred to as a base because mold block half 14 is upside down with respect to mold block half 16). Bases 20, 22 include a T-channel extending from side to side of the aligned mold blocks. The T-channel mates with a T-bar 24 of a carrier block 26 for the respective mold block half 14, 16. The carrier blocks 26 are themselves carried by a longitudinal track of a conveyor of the travelling mold tunnel. For this purpose each carrier block 26 is provided with a groove 30 in its base surface for cooperation with the track. The bases 20, 22 of mold block halves 14, 16 may be formed unitarily with mold block halves 14, 16 or may be separate parts connected to the respective mold block halves through tongue and groove connections In any event, the T-channel and T-bar 24 connections between the carrier blocks and the bases of the mold block halves 14, 16 may allow for the substitution of the mold blocks of the invention by conventional mold blocks having a single mold cavity therethrough when desired. Such conventional mold blocks may have a diameter comparable to the overall diameter of mold blocks 12 or may be somewhat smaller or larger. Indeed the mold blocks 12 may be slid off T-bars 24 and substituted by other inventive mold blocks of different size and/or having a different number or configuration of mold cavities 18 or having different arrangements of vacuum forming tube in mold cavities 18.

FIG. 2A, B, C and D illustrate provision of vacuum to cavities 18 from vacuum manifolds 32 in both mold halves 14, 16. Although other configurations are possible, the illustrated exemplary embodiment shows a vacuum channel 34 extending from top manifold 32 to one of the mold cavities 18, and a vacuum channel 36 extending from the bottom manifold 32 to the other of mold cavities 18. A longitudinally extending (ie parallel to the aligned mold blocks 12) subsidiary vacuum manifold 38 is provided for each channel 34, 36 adjacent the respective mold cavity 18. Communication of vacuum to the inner mold surface of cavities 18 from subsidiary manifolds 38 may be by conventional means. A seal 42 may be provided to inhibit leakage of vacuum.

In the embodiment of FIGS. 1 and 2, it is possible to control the vacuum to each of cavities 18 because separate manifolds 32 supply each of them.

At the interface between mold blocks 12, sealing means 44 may be provide to minimise leakage of vacuum.

Figure 3A:
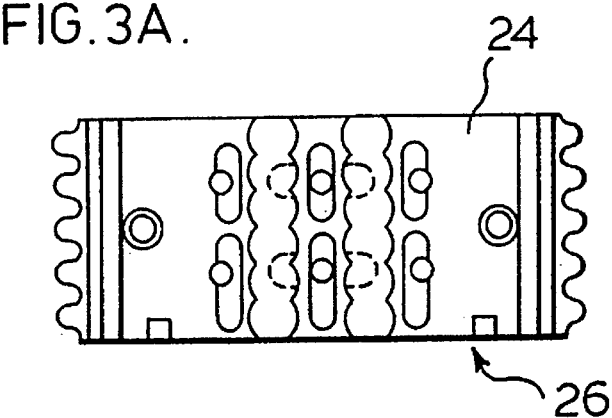
FIGS. 3A, B, C and D are views of an engineering drawing of another embodiment of the invention.
Figure 3B:
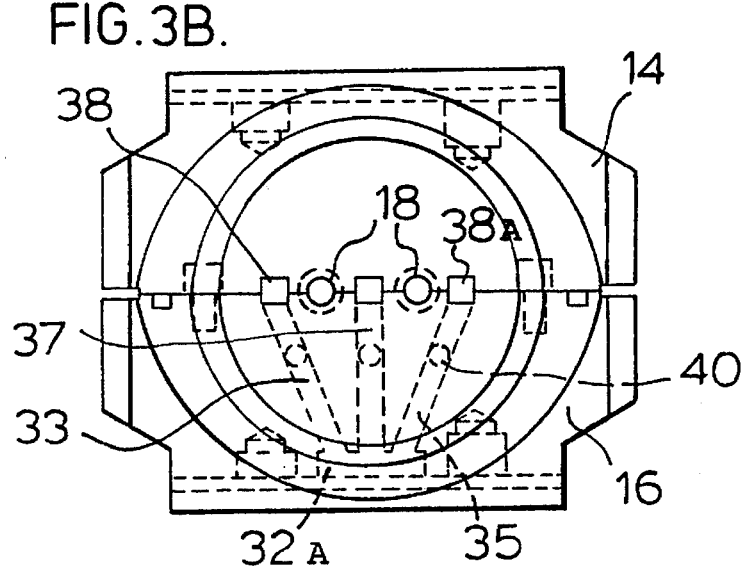
Figure 3D:
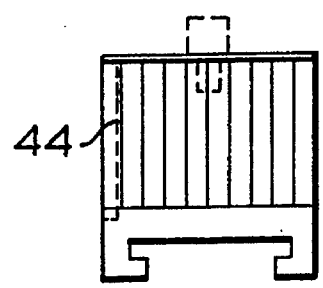
Figure 3C:
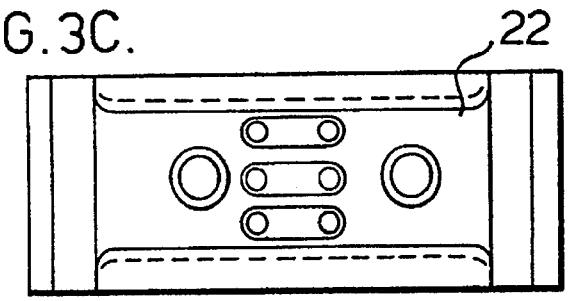

FIGS. 3A, B, C and D illustrate another embodiment. Similar reference numerals are used to indicate similar apparatus parts as in FIGS. 1 and 2. In the FIG. 3 embodiment vacuum is drawn only from a vacuum manifold 32A in the lower mold block halves 16. In this case, three vacuum channels 33, 35, 37 may be provided to distribute vacuum to three subsidiary manifolds 38A located to each side of mold cavities 18. Shut-off valves 40 are provided to control the vacuum in each of channels 33, 35, 37 so that either one of mold cavities 18 may be isolated or the vacuum thereto may be otherwise controlled.

Figure 4A:
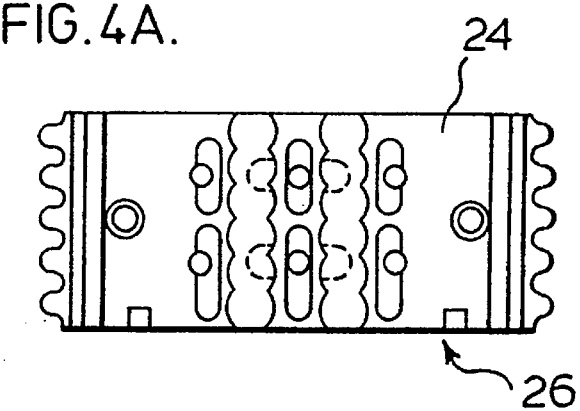
FIGS. 4A, B, C and D are views of an engineering drawing of another embodiment.
Figure 4B:
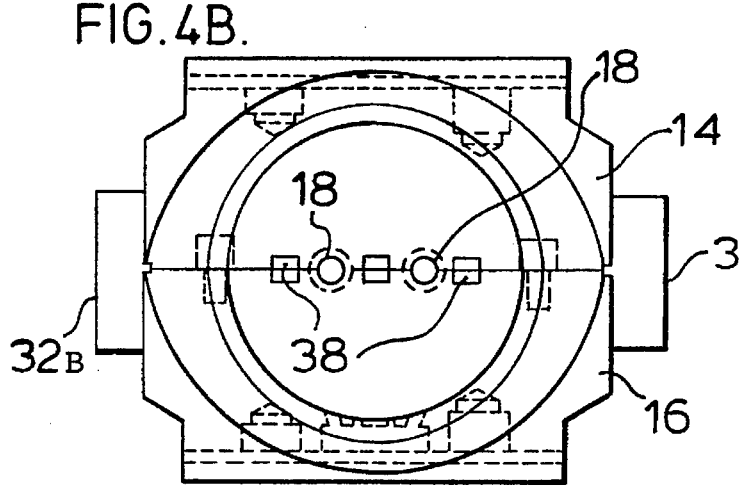
Figure 4D:
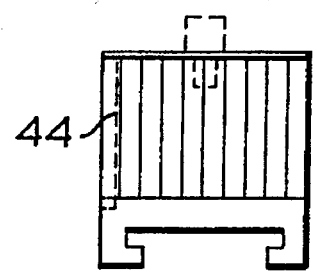
Figure 4C:
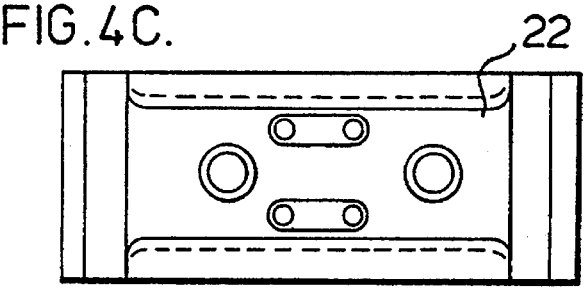

FIGS. 4A, B, C and D illustrate another embodiment employing side vacuum manifolds 32B. Again similar reference numerals to those of the previous Figures are used to indicate similar parts. In this case vacuum is supplied along the parting lines between the mold block halves 14, 16 to subsidiary manifolds 38 and thence to mold cavities 18. A seal 42 may be provided to allow independent operation of mold cavities 18 and to inhibit leakage therebetween.

There may be times when it is not desired to mold tube in all the mold cavities 18 which are provided. This is easily achieved by only extruding thermoplastic material into one of the cavities 18. However, in these circumstances it may be desirable to seal off the unused channel or channels 18 from vacuum. This may be achieved in some embodiments (see for example FIG. 3B) by shut-off valves 40 or in others by the seals 42.

It is to be emphasized that while the drawings indicate only two mold cavities 18, the number of such cavities is limited only by the overall size of mold blocks 12. In practice, it is envisaged that any number from two to ten cavities may be present. The cavities may have similar or different profiles within the same mold tunnel and/or may have similar or different diameters.

The embodiments of the invention in which an inclusive property or privilege is claimed are defined as follows:

1. A mold apparatus having a plurality of mold blocks which move through a mold tunnel where side by side mold blocks are held tightly against one another in said mold tunnel, each of said mold blocks having a plurality of separated independent parallel mold cavities extending longitudinally of said mold tunnel with fie parallel mold cavities of adjacent mold blocks aligning with one another in said mold tunnel and means for applying vacuum to each of said mold cavities at the same time for simultaneously molding a plurality of plastic pipes in said mold apparatus.

2. A mold apparatus as claimed in claim 1 including a vacuum channel to each of said mold cavities.

3. A mold apparatus as claimed in claim 2 wherein each vacuum channel is provided with a vacuum control valve.

4. A mold apparatus as claimed in claim 3 wherein each control valve is moveable between an open and a closed position.

5. A mold apparatus as claimed in claim 1 including means for controlling the vacuum independently to each of said mold cavities.

* * * * *